Inventor.
REINHOLD RÜDENBERG
By. *Heinrich Hochschild*
Atty.

Nov. 12, 1946.  R. RÜDENBERG  2,411,002
DAMPER SYSTEM FOR SYNCHRONOUS GENERATORS
Filed Dec. 31, 1942  6 Sheets-Sheet 3

Inventor.
REINHOLD RÜDENBERG
By. Heinrich Hochschild
Atty.

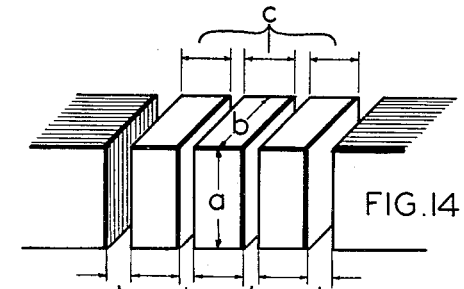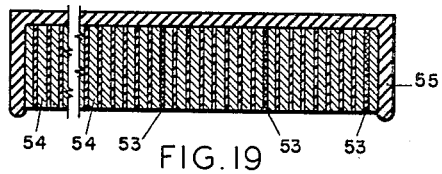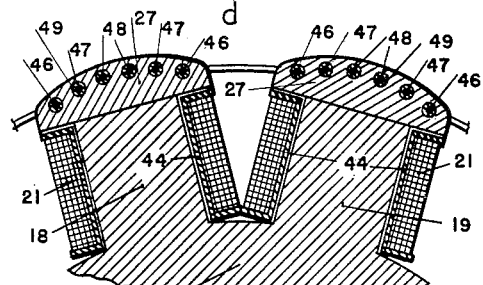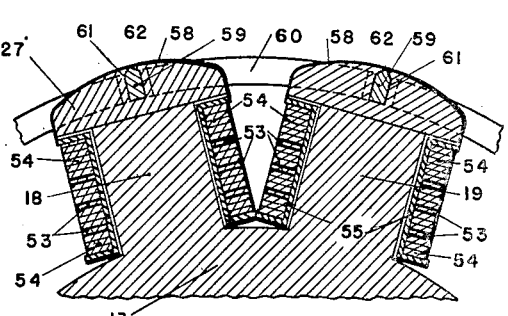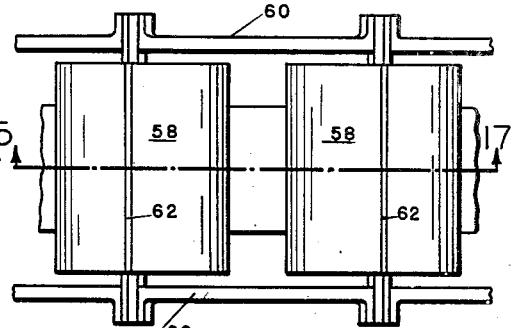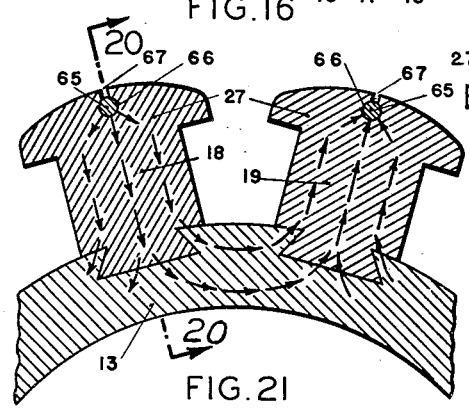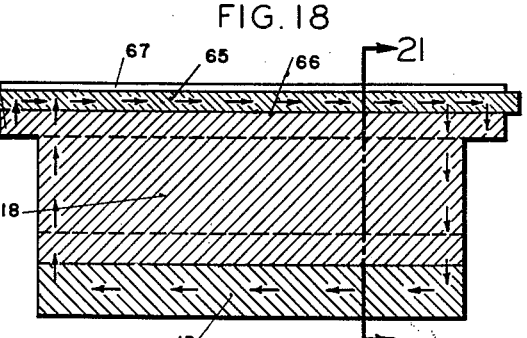

Inventor.
REINHOLD RÜDENBERG
By.
Atty.

Patented Nov. 12, 1946

2,411,002

UNITED STATES PATENT OFFICE 2,411,002

DAMPER SYSTEM FOR SYNCHRONOUS GENERATORS

Reinhold Rudenberg, Belmont, Mass.

Application December 31, 1942, Serial No. 470,867

16 Claims. (Cl. 172—120)

The invention relates to synchronous electrical machines both of the salient and the cylindrical pole types and its objects are new arrangements of the damping circuits on the rotors of these machines, damping circuits, which, while they ensure perfect operation of such synchronous machines especially generators or alternators under normal and abnormal conditions, in addition thereto, suppress or reduce in magnitude those large initial over-currents which arise in case of sudden short-circuits in the lines, especially such short-circuits which occur near the terminals of the machine, effects which with the usual damping circuits cannot be controlled.

More specifically, this invention is concerned with the arrangement of damper circuits on the rotors of said machines and the establishment of a certain definite relationship between said damper circuits and specific magnetic fields of a synchronous electrical machine. These magnetic fields are (1) the magnetic main field on a path in the direct axis of the rotor, (2) the magnetic main field on a path in the quadrature axis of the rotor, (3) the magnetic leakage field in the direct axis of the rotor and closed on a bypath between the poles of each pair of field poles, and (4) the magnetic leakage field in the quadature axis of the rotor and closed on a bypath transversely to each of the field poles; the term "bypath" as herein employed being more specifically explained and defined hereinafter.

In the following specification these four magnetic fields respectively will be understood when the shorter terms (1) direct axis main field, (2) quadrature axis main field, (3) direct axis leakage field, (4) quadrature axis leakage field, are used.

It is the primary object of this invention to bring the aforesaid four magnetic fields and the damping circuits upon, and closed within, the rotor mutually into a relationship so as to obtain the full damping effect of the damper circuits on the direct axis and quadrature axis main fields whereas the two leakage fields or at least the direct axis leakage field may fluctuate freely.

To this end, the invention specifically provides for a mutual arrangement of the electric and magnetic circuits of the machine, specifically of the rotor damper circuits and of the bypath of at least the magnetic leakage field in the direct axis of the rotor, which results in a weak linkage of said circuits compared with the linkage of said damper circuits with the paths of both magnetic main fields—direct axis and quadrature axis fields. More specifically, the magnetic and electric characteristics of said damper circuits and of the bypaths of both leakage fields, or at least of the magnetic leakage field in the direct axis of the rotor, are adjusted so as to result in a time constant of the fluctuations of said leakage fields or field, which is smaller than one-half the period of the alternating current of the network to which the machine is connected.

By this means, the damper circuits of the invention, in the same way as the known damper circuits will affect the direct axis field and will prevent over-voltage in the field exciting machine if this exciter is of high self-inductance, and, in any case, in the field winding if this winding is accidentally opened. Since the quadrature axis field is likewise damped by damper circuits of the invention, the new machine may carry any unsymmetrical or single-phase load and any hunting of the machine caused by disturbances during its operation will be suppressed.

In contradistinction to the known machines, however, in a machine of this invention, the direct axis leakage flux, as it is not closely linked with damping circuits, is free to fluctuate and can develop freely when short-circuit currents occur.

This freely fluctuating direct axis leakage flux will therefore decrease the magnitude of these short-circuit currents. In certain embodiments of the invention to be used preferably in case of large quadrature axis armature reaction, as for instance, with turbo-alternators of the cylindrical rotor type, provision is made that the quadrature axis leakage flux may likewise fluctuate freely and thus further decrease the magniture of short-circuit currents in the stator.

Further objects of the invention and various of its embodiments will be set forth in the specification as it proceeds and be illustrated in and by the accompanying drawings which are to be understood explicative of the invention and not limitative of its scope. Other embodiments incorporating the principle underlying my invention are feasible without departing from the spirit and ambit of my appended claims.

In the drawings:

Fig. 14 is a scheme for illustrating the computation of the magnitude of the time constant of a machine;

Figure 1:
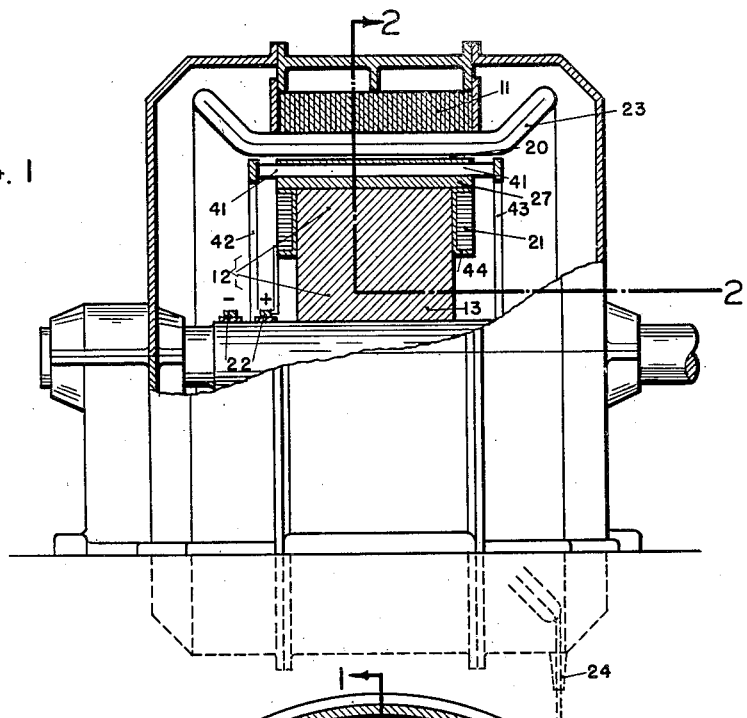
Fig. 1 illustrates a side elevation, partly in section, along the line 1—1 of Fig. 2, of a synchronous generator of the salient pole type with a pole shoe damper system and a bobbin damper system of this invention mounted on the rotor.

Figs. 15 and 17 show an elevational section respectively along the lines 15—15 and 17—17 of Figs. 16 and 18, and Figs. 16 and 18 a top view of a pole pair each provided with a modification of the damper systems illustrated in Fig. 1;

Fig. 19 represents on an enlarged scale and in section part of the bobbin damper of Fig. 17;

Fig. 20 is a longitudinal section, along the line 20—20 of Fig. 21; and

Figure 2:
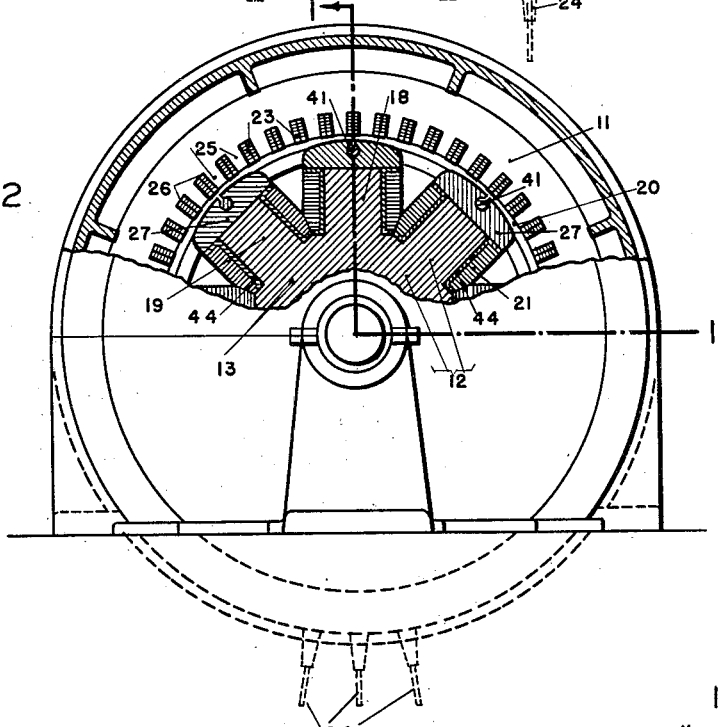
Fig. 2 is a front elevation, partly in section, along the line 2—2 of Fig. 1, of the same machine.
Figure 22:
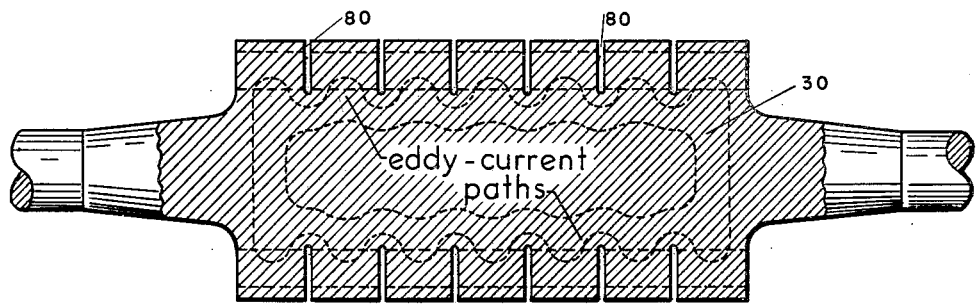
Figure 23:
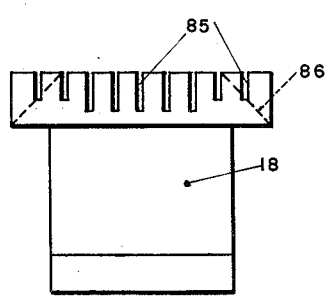
Figure 24:
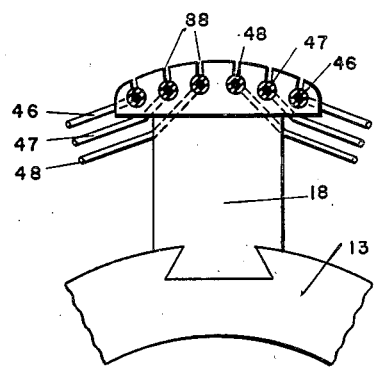
Figure 25:
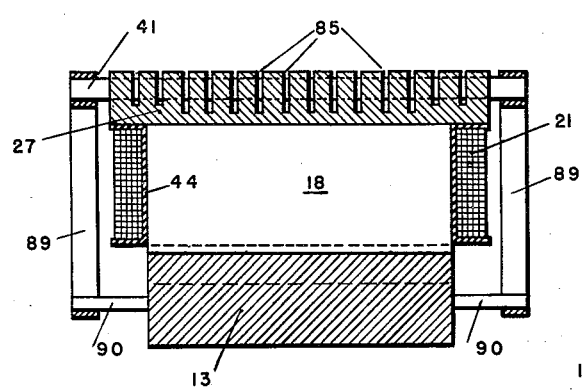
Figure 26:
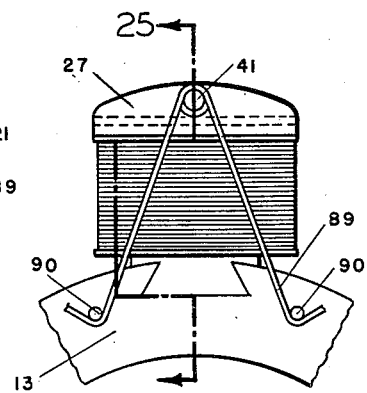
Figure 27:
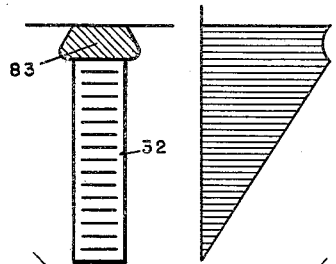
Figure 28:
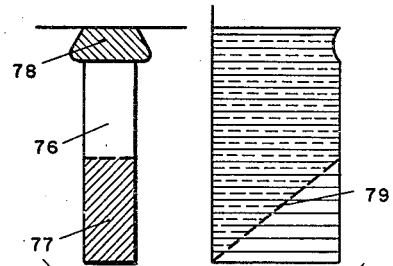
Figure 29:
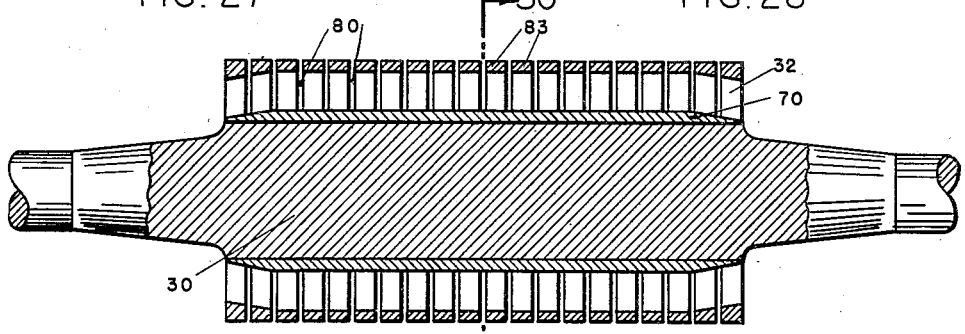
Figure 30:
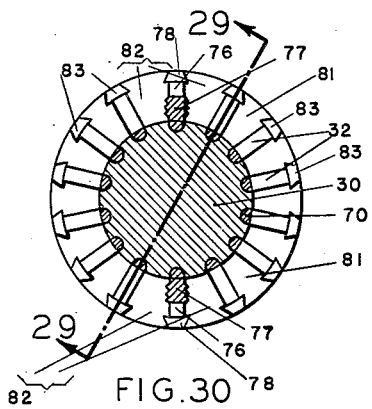

Fig. 21 a cross section, along the line 21—21 of Fig. 20 of a modification of the pole shoe damping system of Figs. 1 and 2;

Fig. 22 is a longitudinal section of the body of a cylindrical rotor provided with circumferential slits for adjusting the electric and magnetic characteristics of the eddy current paths;

Fig. 23 is a longitudinal elevation of a pole provided with circumferential slits and oblique slits at the side faces;

Fig. 24 shows a diagrammatic side view of a pole provided with damper windings in the pole shoe at a distance from the pole shoe surface;

Fig. 25 shows a longitudinal elevation partly in section, along the line 25—25 of Fig. 26, and Fig. 26 a side view of a pole provided with two damper systems and circumferential slits as another embodiment of the invention;

Fig. 27 illustrates diagrammatically a rotor slot with its exciting windings together with a diagram of the slot leakage flux in the direct axis;

Fig. 28 shows diagrammatically a slot with damper winding together with a diagram of the slot leakage flux in the quadrature axis;

Fig. 29 is a longitudinal section, along the line 29—29 of Fig. 30, and

Fig. 30 a cross section, along the line 30—30 of the iron body of a cylindrical rotor provided with circumferential slits, a damper system at the slot bottoms, and an additional damper system in slots arranged in the center parts of the poles.

In Figs. 1, 2, 6, and 7, the stator of the machine is designated by 11, its rotor by 12, both separated from each other by an air gap 20. The field poles 18, 19, mounted on, or solidary with, the rotor core 13, are provided with exciter windings 21 fed from any conventional source of direct current through the collector rings 22.

The stator 11 is provided in the usual manner with armature windings 23 arranged in slots 26 between teeth 25, and connected through the terminals 24 to an alternating current network.

A cylindrical rotor is shown in Figs. 3, 4, 8, and 9. Its core is designated by 30, the field poles by 28 and 29. Field windings 31 are embedded in slots 32 between teeth 36 and are secured within the slots by wedges 33, the end connectors 34 of the field windings being held against the action of the centrifugal force by end bells 35.

For the purpose of not obscuring or crowding the aspect of my drawings, I have omitted in the following figures details not essential to the explanation of my invention. As a stator has been illustrated in Figs. 1 and 2, I have indicated the stator only schematically in Figs. 6 to 9, whereas, in the other figures, the stator has been omitted. Instead of complete rotors I have shown in some instances only single poles or one pair of poles. In some figures I have omitted from the showing the field windings. It will be readily understood therefore that for the actual carrying out of complete machines embodying my invention, these omitted details may be easily supplemented by any one familiar with the construction of synchronous machines.

In order to define clearly the terms which I use in the following specification and claims, I have shown in the diagrammatic views of Figs. 6 to 9 for a given position of the rotor schematically the location of the paths of the four magnetic fields which I have enumerated above.

Figure 3:
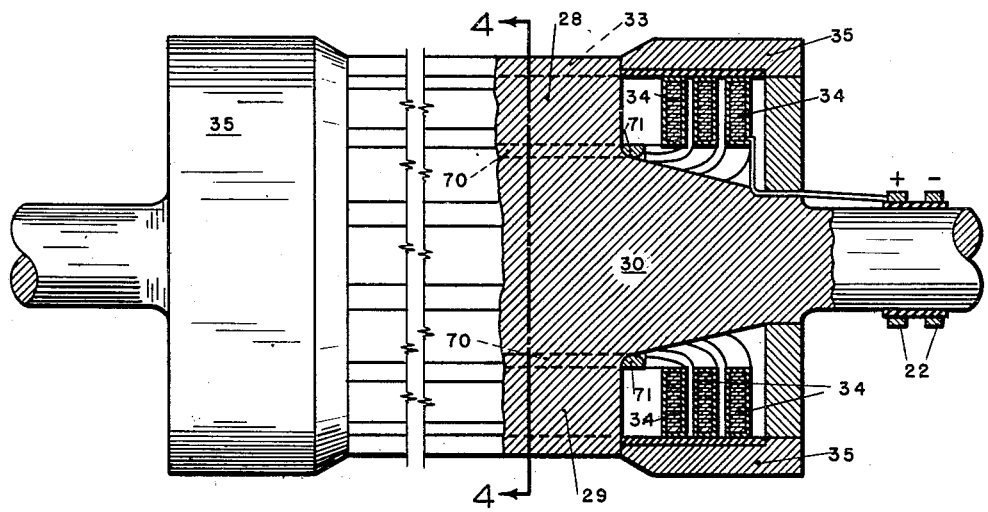
Fig. 3 is a longitudinal view, partly in section, along the line 3—3 of Fig. 4, of a cylindrical rotor provided with a slot damper system in accordance with this invention.
Figure 4:
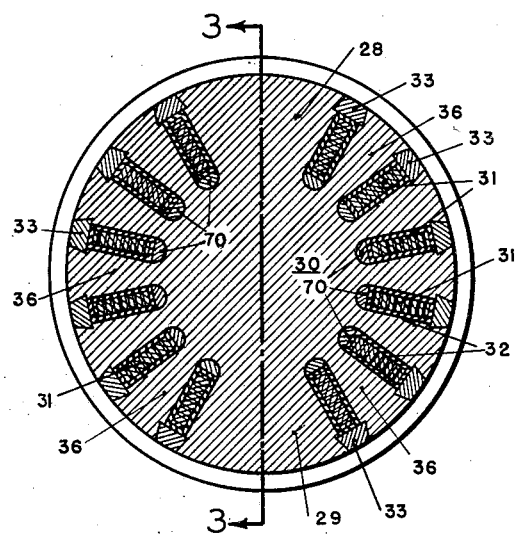
Fig. 4 is a cross section, along the line 4—4 of Fig. 3, of this rotor showing the slots of the rotor, its field and damper windings.
Figure 8:
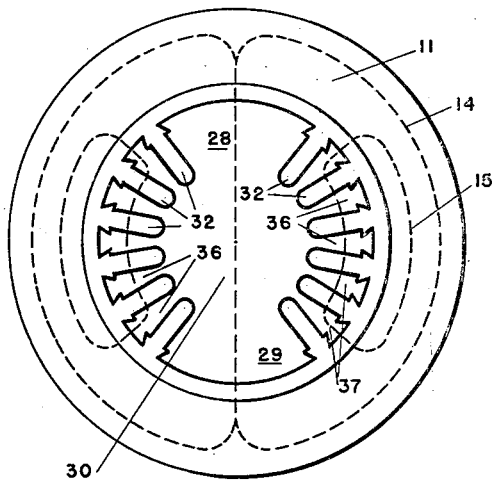
Figs. 8 and 9 show corresponding views of the location of the paths of the four magnetic fields in the case of a machine with cylindrical rotor.
Figure 9:
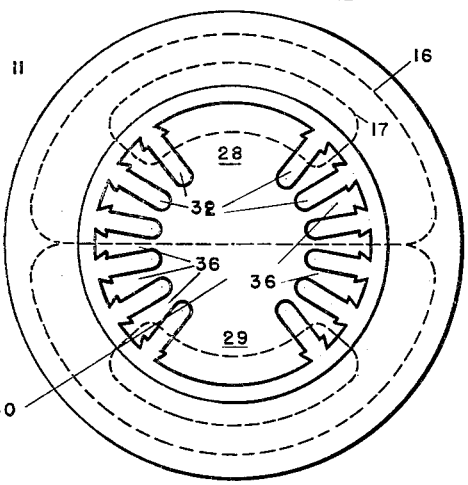

The paths of the four magnetic fields are indicated by dashed lines 14, 15, 16, and 17, respectively. 14 represents (Figs. 6 and 8) the path of the magnetic main field produced by the exciter winding 21 of the field poles 18, 19, Figs. 1 and 2, or the exciter winding 31 of the field poles 28, 29, Figs. 3 and 4. This path is in the direct axis of the rotor, traverses the stator teeth 25 and windings 23, (Fig. 2), the rotor core 13, Fig. 2, or 30, Fig. 4, twice the air gap 20, and is closed through the armature or stator frame 11. 16 indicates (Figs. 7 and 9) the path of the magnetic main field produced by the armature windings 23 in the quadrature axis of the rotor. This path traverses the stator core 11, the stator teeth 25 and windings, Fig. 2, twice the air gap 20, the interpole space or quadrature axis of the rotor pole system and the rotor core 13 (Fig. 7 or 1), or 30 (Fig. 9 or 2).

Figure 6:
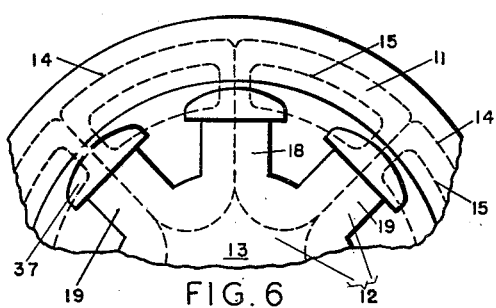
Figs. 6 and 7 show diagrammatically and in elevation a section of the magnetic frame of a salient pole machine of the type of Figs. 1 and 2 and illustrate schematically the location of the paths of the four magnetic fields of the machine.

15 illustrates the path of the magnetic leakage field in the direct axis of the rotor. This path traverses the pole ends 37, twice the air gap 20, the stator teeth 25 and windings 23, and is closed in the rotor space on a path between the field poles 18 and 19, Fig. 6 or 28 and 29, Fig. 8. Since, as the diagrams Figs. 6 and 8 illustrate, this path between the field poles closes the magnetic leakage field in the direct axis of the rotor on a bypath to the main field in the direct axis, I shall, in order to designate this path and to distinguish it from the main path of this field, employ in this specification and in the claims for this path the term "bypath on the rotor which closes the magnetic leakage field in the direct axis between the field poles."

Figure 7:
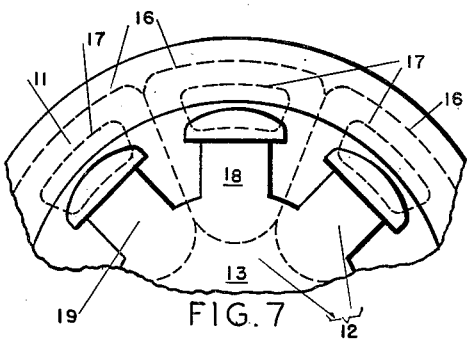

17, finally, shows the path of the magnetic leakage field in the quadrature axis of the rotor. This path traverses the stator teeth 25 and windings 23, twice the air gap 20, and is closed in the rotor space on a path transversely of each field pole 18 and 19, respectively, in Fig. 7, or 28 and 29, respectively, in Fig. 9. Since, as the diagrams Figs. 7 and 9 illustrate, this path transversely of the field poles closes the magnetic leakage field in the quadrature axis of the rotor on a bypath to the main field in the quadrature axis, I shall, in order to designate this path and to distinguish it from the main path of this field, employ in this specification and in the claims for this path the term "bypath which closes on the rotor the magnetic leakage field in the quadrature axis transversely of the field poles."

The paths of the magnetic main fields and of the magnetic leakage fields in the direct axis and those in the quadrature axis have respectively been shown in two separate figures, viz. Figs. 6 and 7 for a salient pole type machine and in Figs. 8 and 9 for a cylindrical rotor type machine. This separate showing is for the purpose of clearness only, it is obvious, however, these four magnetic fields are simultaneously present and are thus to be considered simultaneously in any synchronous machine.

Figs. 10 to 14 are drawn for the explanation of the terms "period," "time constant," and "linkage."

1. Period (a) *Expressed by change with time*

Figure 10:
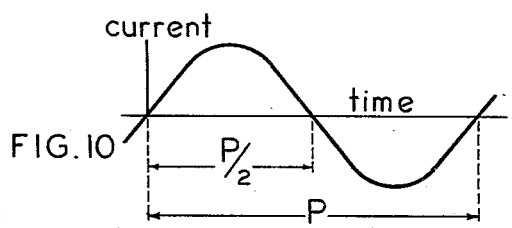
Figs. 10 to 13 are diagrams showing the development of the terms "time constant" and "linkage"

I have shown in Fig. 10 in the conventional way the curve of an alternating current and indicated by P its "period" that is the time after which repetition of the phenomenon occurs.

(b) *Determined by the data of the synchronous machine*

The period may be expressed by the number $p$ of pole-pairs and the number of revolutions per second as $$P = \frac{1}{pn}$$

or $$\frac{1}{\text{number of pole-pairs} \times \text{number of revolutions per second}}$$

2. Time Constant (a) *Expressed by change with time*

Figure 11:
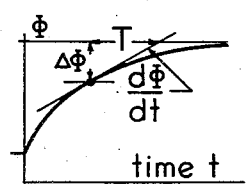

The time constant T of a magnetic field is a time defining the natural speed of a fluctuation of the field. If $$\frac{d\phi}{dt}$$

means the rate of change of flux $\phi$ with time, and $\Delta\phi$ means the difference between momentary and final value of the varying flux, then according to Fig. 11

$$\frac{d\phi}{dt} = \frac{\Delta\phi}{T}$$

Therefore, the time constant is given as $$T = \frac{\Delta\phi}{d\phi/dt}, \text{ or } \frac{\text{deviation from final value of flux}}{\text{rate of change of flux}}$$

(b) *Determined by circuit and field*

Ohmic resistance R and self-inductance L of an electric circuit linked with the magnetic field under consideration determine the time constant of this electromagnetic field as $$T = \frac{L}{R}, \text{ or } \frac{\text{self-inductance}}{\text{resistance}}$$

(c) *Several time constants*

Electric circuits or magnetic fields may have two or even more time constants. This is shown, for example, in Fig. 12 where the time constant $T_1$ may be that of a main field and $T_2$ that of a leakage field.

3. Linkage

The intensity of the electromagnetic interaction between an electric circuit and a magnetic field is expressed by the linkage.

Figure 13:
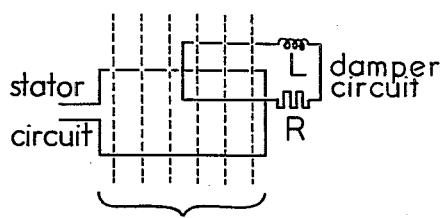
Figure 12:
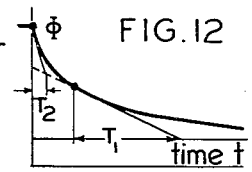

As shown at Fig. 13 weak linkage of a damper circuit with a field path may be attained by:

(i) Placing the damper circuit out of the full range of the field $\phi$, the fluctuations of which may be produced by stator currents.

(ii) Increasing the self-inductance L of the damper circuit, (iii) Increasing the resistance R of the damper circuit.

Since the flux linked with the damper circuit contributes to the self-inductance, means (i) and (iii) result in a small time constant $$\frac{L}{R}$$

In the usual damper circuits, if their resistance and their inherent inductance are sufficiently small, the damper currents, closed in themselves, will prevent by interaction the fluctuation of any magnetic fields in the rotor including those which rotate synchronously with the rotor. In case of a sudden development of short circuit currents in the stator winding, the usual damper will therefore prevent or considerably delay any rapid transient variation of the direct axis leakage flux. It is therefore the effect only of the stator leakage which will limit the magnitude of the initial short-circuit current.

If, however, in accordance with my invention, the damper circuits are so arranged that their linkage with the bypaths of both the leakage field in the direct axis of the rotor and the leakage field in the quadrature axis of the rotor, or at least with the bypath of the leakage field in the direct axis of the rotor, is weak compared with the linkage of said damper circuits with the paths of both magnetic main fields, the damper circuits will retain all the useful damping effects on the main fields revolving with the rotor or over the rotor, while, for instance, as in the case of a sudden short-circuit of the stator-winding, any detrimental effect on the leakage fluxes in both axes of the rotor or at least in the direct axis of the rotor is avoided.

Thus, for instance, if the rotor leakage in the direct axis of a certain machine is 2/3 of the value of the stator leakage, the initial magnitude of the sudden short circuit currents will be reduced to $$\frac{3/3}{3/3 + 2/3} = 60\%$$

when the machine is provided with the dampers of this invention.

Generally, with my new dampers the initial value of the sudden short-circuit currents is determined no longer by the leakage of the stator alone but by the value of the total of stator and rotor leakages.

The optimum effect of the damper circuits of my invention will be reached when the magnetic and electric characteristics of the damper circuits, namely their self-inductance and their electric resistance, and the magnetic resistance of the bypaths of both magnetic leakage fields or at least the bypath of the magnetic leakage field in the direct axis of the rotor are adjusted so as to result in a time constant of the fluctuations of both said magnetic leakage fields or at least that in the direct axis, respectively, smaller than half the period of the alternating current as will be shown later on.

In the case where the linkage of the damper circuits with the bypaths of both the magnetic leakage field in the direct axis and that in the quadrature axis of the rotor are weak compared with the linkage of said damper circuits with the paths of both magnetic main fields, the reluctances of both said bypaths, including possible reluctances of any end connectors of the windings, in a preferred embodiment of the invention, are adjusted to substantially the same values. Generally, the reluctance R is determined by $$R = \frac{l}{\mu \cdot a}$$

wherein $l$ is the length, $a$ the cross-sectional area of the path, and $\mu$ the permeability. Since the path is composed of magnetic lengths and air lengths, in the evaluation of the reluctance, with the conventional methods and taking into consideration of these parts, it is obvious that the reluctances of the iron lengths in the bypaths are negligible against the air lengths.

For all practical purposes, therefore, the aforesaid condition may also be expressed: The lengths of the bypaths in air over the mean cross sections of the bypaths in air are to be laid out to have substantially the same value for both the bypath which closes the magnetic leakage field on the rotor in the direct axis and the bypath which closes the magnetic leakage field on the rotor in the quadrature axis.

In terms of space, the principles upon which the design of the damper circuits of this invention will be based, are as follows:

The direct axis damper circuits will be arranged remote from the air gap between rotor and stator, since the direct axis leakage field always flows in those parts of the rotor which are adjacent to the air gap. Thus, the direct axis damper will not be situated above the field winding, as has been the usual practice up to now, but it will be located within or below the zone of the field winding.

The quadrature axis damper may also be disposed below the zone of the field winding and may possibly be combined with the direct axis damper to a complete damper cage. Or, a quadrature axis damper may be located within the field winding or above the field winding or at both places, provided the damper is so disposed that sufficient quadrature axis leakage flux may flow between armature winding and damper, and provided that the damper is not linked with the direct axis leakage flux. The damper is, for example, not linked with the direct axis leakage flux if its axial conductors are located at the center pole lines.

The magnetic and electric characteristics of the machine may be calculated by the usual methods in order to adjust them so as to obtain the desired time constant of the fluctuations. Furthermore, if desired, certain steps may be taken subsequently, after completion of the machine, by means of which the results actually obtained may be corrected or adjusted.

If, for instance, the core of the rotor is of solid magnetic steel, eddy currents may occur. The time constants of these eddy currents which damp the direct axis leakage field, or the quadrature axis leakage field, or both, may then be not small enough compared with half the period of the stator alternating current.

These damping effects may, however, be reduced to the desired values if, in accordance with another feature of the invention, circumferential slits are provided within the zone of the bypath of the direct axis leakage field, or of the quadrature axis leakage field or of both.

Fig. 14 illustrates schematically how in an actual machine the time constant of a leakage flux may be computed from an equivalent arrangement, sufficiently accurate in most of the cases practically occurring.

The paths of both the direct and quadrature axes leakage fluxes may consist of several steel parts, as for example the rotor teeth in Fig. 4, of several air gaps, for instance the rotor slots 32 and additional thereto the gap between stator and rotor, for instance 20, and of laminated steel parts provided by the stator iron which closes the magnetic circuit.

In the equivalent scheme of Fig. 14, the total of the lengths of the solid iron paths is indicated by $c$ and of the air paths by $d$. Let $a$ and $b$ be the equivalent cross sections of the solid magnetic path, the eddy current time constant of such a scheme, as shown in principle in Fig. 14, may then be computed from the dimensions $a$, $b$, $c$, and $d$, as $$T = \frac{4}{\pi s} \frac{c}{d} \frac{ab}{\frac{a}{b}+\frac{b}{a}}$$

where $s$ is the specific electric resistance of the solid steel parts.

In the embodiment of the invention shown in Figs. 1 and 2, the salient pole rotor is provided with two systems of dampers. One system comprises damper windings 41, 42, 43, closed about, and coaxially with, the quadrature axis and is disposed within the field poles 27 in proximity to the air gap surfaces of the field poles 18 and 19.

The second damper system comprises damper windings upon the field poles closed about, and coaxially with, the direct axis and disposed in spaced relation to the air gap 20.

The first system, the damper for the quadrature axis main flux, consists of bars 41 embedded in slots in the center of the pole shoes 27 and closed by end conductor rings 42, 43 at both axial faces of the rotor. Each pair of adjacent bars 41 and the sectors of the rings 42, 43 connecting them, form a single short-circuited turn which surrounds coaxially the quadrature axis in the interpole space. This winding is linked only with the quadrature axis flux, and not with any main flux or leakage flux in the direct axis of the poles. Since this position of the bars 41 is symmetrical to the direct axis flux, this flux does not influence the damper and thus all the bars may be connected by the conducting end rings 42, 43 to a one-bar-per-pole cage. Since the bars are in a neutral position in relation to the direct axis fluxes, the bars need not be insulated from the steel poles, a fact which greatly facilitates the construction.

The second system, the damper for the direct axis main flux, is a frame 44 of copper or other conductive material surrounding the pole core. This frame 44 may be used, as the drawings show, simultaneously as a bobbin for the field coils 21, and will thus be generally of L-shape cross section. Frame 44, therefore, forms a damper circuit linked with the main flux only but not, or only weakly, with the leakage flux in the direct axis of the rotor. This leakage flux in the direct axis of the rotor may therefore vary freely with any fluctuation of the armature current.

Figs. 2, 6 and 7 show that the linkage of the damper circuits for the direct axis main flux with the bypath of the magnetic leakage field in the direct axis of the rotor is weak compared with the linkage of the damper circuits with the paths of the main magnetic field in the direct axis. The damper circuits for the quadrature axis are linked only with quadrature axis fields.

Machines of this invention will be designed with regard to the magnetic and electric characteristics of the damper circuits and of the bypaths of the two magnetic leakage fields, or at least of the leakage field in the direct axis, or the characteristics of the bypaths and the damper circuits will be so adjusted with regard to each other, that, resulting from this design or adjustment, the time constants of the fluctuations of the magnetic leakage field in the direct axis and in the quadrature axis, or at least the time constant of the fluctuations of the leakage field in the direct axis is smaller than half the period of the alternating current.

The embodiment of the invention illustrated in Figs. 15 and 16, shows the damper circuits for the direct axis main field in form of coil bobbins 44, disposed remote from the air gap and substantially outside of the bypath of the direct axis leakage field.

The quadrature axis damper system consists of a number of turns 46, 47, 48, insulated by tubes 49 and embedded into slots 50 near the face of the pole shoe and closed on the faces of the rotor. They form individual short-circuited turns coaxial with the quadrature axis in the interpole space. These turns may consist of one bar each or of any number of wires of conductive material. They are linked only with the quadrature axes fluxes and not with any main or leakage fluxes in the direct axis of the poles.

In the example shown in Figs. 17, 18, and 19, damper circuits for the direct axis main field comprise short-circuited turns 53 inserted between layers of the field winding 54, whereas the bobbins 55 may either be of insulating or poorly conducting material or may likewise be used as a damper of the direct axis main field. The short-circuited or damper turns 53, when the field winding is wound of flat copper strips, as indicated in the drawing, may be formed by brazing, soldering or welding together a few consecutive turns of the field winding which then are left without insulation. These short-circuited turns may also be arranged only at the lower part of the pole, leaving the upper part of the pole free for the fluctuations of the direct axis leakage field.

The poles are further provided near their pole shoe surfaces 58 with a one-bar-per-pole cage consisting of uninsulated bars 59 of conductive material connected to a cage by ring sectors 60 at the faces of the rotor. The bars 59 are embedded within slots 61 tapering towards the pole faces and opening thereto with a narrow slit 62.

Figs. 20 and 21 illustrate a pole which is long in the axial direction of the rotor. In this case, end connectors for the single damper bars in the pole shoes may be dispensed with if the uninsulated bars are firmly seated within their slots 66. The slots of these bars may again be closed as Fig. 15 shows, or they may be open and form narrow slits 67 above the damper bars 65 as in Figs. 20 and 21. These figures illustrate by means of the arrows the flow of the damper currents within the poles and from pole to pole.

In turbo-alternators with cylindrical rotors, the rotor slots are usually closed by means of wedges of brass or a similar material of high tensile strength and high electric conductivity. In machines of this invention, however, the axial overall conductance of the wedges is to be reduced, for instance, by providing non-magnetic or even-magnetic steel wedges (33 in Figs. 4 and 5) or wedges of some other poorly conductive material. In this way free fluctuations of the rotor leakage fluxes in a transverse direction through the slots are made possible.

Figs. 3 and 4 illustrate the rotor slot damper system of this invention which is to replace the usual damper constituted by conductive wedges of the rotor.

Bars 70 of copper or other highly conductive material and of appropriate form, are embedded within the slots 32 at their bottom. The damper bars 70 are connected to a cage by means of conductive end rings 71 connecting the axial ends of the damper bars at either side of the rotor. The damper cage thus formed is perfectly linked with the magnetic main fluxes of both the direct and quadrature axes.

Figure 5:
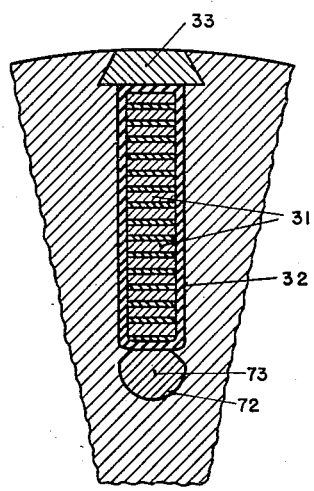
Fig. 5 shows the cross section of a modified rotor slot with damper bar, on an enlarged scale.

In the modification shown in Fig. 5, conductive bars 73 tapered and flattened towards the bottom of slots 32 are embedded within separate semi-closed grooves 72 underneath, and opening into, the slots 32. The bars of the rotor in this modification are electrically or conductively connected with one another by being fitted closely within their grooves 72 and thus giving good contact with the steel body of the rotor. The bars may be forced plastically into their grooves after the contacting surfaces had been thoroughly cleaned.

For turbo-generators with cylindrical rotors it will be expedient to reduce the damper effect also on the quadrature axis flux to such an extent that the leakage flux through the rotor slots, or a large part of it, may freely fluctuate. While, due to the action of the currents in the field winding, the slot leakage flux in the direct axis is of triangular distribution as shown in Fig. 27, the slot leakage flux in the quadrature axis does not decrease towards the bottom and its distribution is rather rectangular as illustrated in Fig. 28. It may therefore be useful to fill slots 76, as shown in Figs. 29 and 30, in the center part 82 of the pole pieces, partially or entirely, with damper bars 77 in order to adjust the magnitude of the quadrature leakage flux.

The influence of such damper bars, as dashed line 79 shows, decreases the distribution of the resultant flux towards the bottom of the slot. This resultant flux is indicated by the densely shaded part of the diagram.

Bars 77 may be of copper or other conductive material. The slots 76 may be closed at their tops with wedges 78 of magnetic material whereas the other slots 32 may be closed by wedges 83 of non-magnetic material.

The bottom dampers 70 are perfectly linked with the direct axis main field and the quadrature axis main field but only weakly linked with the direct axis and the quadrature axis leakage fluxes. Bars 77 are in a position neutral to the direct axis fluxes, they are, however, linked with the quadrature axis main flux, but weakly linked with the quadrature axis leakage flux. By appropriately choosing, and harmonizing with each other, dimensions, positions, and other characteristics of both dampers, any desired damping effect may be set or adjusted.

If the rotor is built up partly or entirely of solid steel, the overall longitudinal conductance of the wedges may be reduced for instance by replacing the conductive wedges through poorly conductive steel wedges, or by subdividing copper or brass wedges into short lengths. Eddy currents will thus develop mainly in the rotor body. These eddy currents, in spite of the specific resistance of the rotor body, may cause considerable damping effects because of the large cross-sections offered to these currents. These damping effects may be adapted to the purposes of this invention, the more so, if by the means offered by this invention the eddy currents are limited as to their magnitude and the places where they occur. They may then cooperate with the dampers or replace them in part.

In accordance with the invention, the damping eddy currents may be reduced in their magnitude or suppressed to such an extent that the direct axis leakage flux is enabled to fluctuate freely by being relieved from the linkage with eddy currents. Furthermore, it will suffice to weaken this linkage only to an extent that the time constant is small enough to enable the leakage flux to follow the ascent of any short-circuit current suddenly originating in the stator winding. This ascent or variation will occur in half a period of the alternating current and the invention provides therefore an adjustment of the magnetic and electric characteristics of the damper circuits and of the bypath of the two leakage fields or of at least the magnetic leakage fields in the direct axis so as to result in time constants of the fluctuations of the two leakage fields, or of at least the magnetic leakage field in the direct axis, smaller than half the period of the alternating current.

Fig. 22 shows how this object of adjusting the magnitude of the eddy currents and determining or restricting the place or places where they occur, may be attained by circumferential slits of appropriate dimensions. These slits 80 may be extended over the whole circumference of the rotor, as Figs. 29 and 30 show. They subdivide the eddy current paths along the teeth 81, the pole pieces 82, and the wedges 83 of the slots 32. The resistance of the eddy current paths within the zones of the leakage paths may thus be increased and the linkage and time constant reduced to the desired values.

In the embodiment of a turbo-alternator illustrated in Figs. 29 and 30 various features of this invention have been combined. Non-magnetic steel wedges 83 hold the field coils; circumferential slits 80 through teeth 81, wedges 83 and pole pieces 82 reduce the leakage time constants in both axes, so as to prevent any substantial damper action at and near the pole faces; slot-bottom copper dampers 70 ensure direct axis and quadrature axis main flux time constants of sufficient magnitude; and slots 76 at the pole centers, closed by magnetic steel wedges 78 for a smooth magnetic surface and partially filled with copper bars 77 adjust the quadrature axis leakage flux to the direct axis leakage flux of the slots and of the end windings of the rotor.

Fig. 23 shows the same principles applied to solid poles 18 of salient-pole synchronous machines. It is sufficient in most cases to groove circumferential slits 85 in the pole shoes only, down to a depth which subdivides an appropriate cross-section for the free fluctuation of the leakage fluxes flowing within the poles. In order to enable the leakage field fluctuations also to enter the axial ends of the pole shoes, these too may be appropriately subdivided by axial slits as at 86.

The most balanced reaction on the currents in the armature winding will be obtained when the free rotor leakage fluxes in both the direct axis and the quadrature axis are made equal or when the reluctances of both their bypaths are adjusted to substantially the same values. This can be achieved in salient pole machines by a proper adjustment in space of the direct axis and the quadrature axis damper systems so as to obtain equal free leakage fluxes in both axes.

In cylindrical rotors this object may be achieved by suitably adjusting slot-bottom dampers; width and depth of central pole slots and of central pole bars; forms, depths, widths, and spacing of circumferential slits.

Fig. 24 shows an example how for this purpose by choosing appropriately the depths of the slits 88 above the pole bars, the total quadrature axis flux may be subdivided, in an arbitrary proportion, into a damped main part within the cage formed by the damper system 46, 47, 48, and a non-damped leakage part without the cage.

Figs. 25 and 26 show another embodiment of the invention with bobbin dampers 44, furthermore, pole bar dampers 41 connected with one another at the faces of the rotor by means of U or V shaped end connectors 89 mounted by means of pins or bars 90 at the spider 13 of the rotor. Such connectors, by their increased leakage, permit a certain amount of the quadrature flux to fluctuate freely. In order to enable the quadrature axis leakage flux to vary in the solid part of the pole, the pole shoe 27 is provided with circumferential slits 85 extended below the dampers bars 41.

Synchronous machines built with the damper circuits of this invention will develop initial short-circuit currents which are much smaller than those developed in machines with ordinary squirrel-cage or pole-cage dampers. In machines of this invention the rotor leakage reactance will participate to its full value in limiting the initial short-circuit peak, and, in addition thereto, owing to the reduced magnitude of this peak, a stator leakage reactance will result which through the lower resultant saturation is considerably greater than that which may be obtained with ordinary dampers.

Since through the dampers of this invention the magnitude of the short-circuit currents may be reduced towards one half, power stations, the maximum capacity of which is limited preponderantly by the magnitude of the initial short-circuit currents, may now be designed with up to twice the former capacity.

I claim:

1. In a synchronous generator, a rotor having a field system including poles and field windings surrounding said poles for producing a magnetic field in the direct axis of said field system; said rotor further having damper circuits about the direct axis and damper circuits about the quadrature axis of said field system; said damper circuits about the direct axis, to the exclusion of any direct axis damper system near the peripheral faces of said poles, disposed in spaced relation to said peripheral pole faces and substantially within the rotor space surrounded by the peripheral zone comprising the bypaths which close the magnetic leakage fields on said rotor respectively between and transversely of said field poles.

2. A synchronous generator as set forth in claim 1 wherein both said damper circuits are disposed in spaced relation to said peripheral pole faces and substantially within the rotor space surrounded by the peripheral zone comprising the bypaths closing the magnetic leakage fields on said rotor respectively between and transversely of said field poles.

3. A synchronous generator as set forth in claim 1 wherein both said damper circuits are disposed in spaced relation to said peripheral pole faces and substantially within the rotor space surrounded by the peripheral zone comprising the by-paths closing respectively the magnetic leakage field in the direct axis between said field poles and the magnetic leakage field in the quadrature axis transversely of each of said field poles, and wherein the lengths of the bypaths in air over the mean cross sections of the bypaths in air are laid out to have substantially the same value for both the bypath which closes the magnetic leakage field on said rotor in the direct axis and the bypath which closes the magnetic field on said rotor in the quadrature axis.

4. In a synchronous generator, a rotor, at least the core of said rotor being of magnetic steel admitting of the formation of damping eddy currents, said rotor having a field system including poles and field windings surrounding said poles for producing a magnetic field in the direct axis of said field system, said rotor further having damper circuits about the direct axis and damper circuits about the quadrature axis thereof; said damper circuits about the direct axis, to the exclusion of any direct axis damper system near the peripheral faces of said poles, disposed in spaced relation to said peripheral pole faces and substantially within the rotor space surrounded by the peripheral zone comprising the bypaths closing respectively the leakage field in the direct axis between said field poles and the leakage field in the quadrature axis transversely of each of said field poles; said rotor being provided, at least within said bypath which closes the leakage field of the direct axis, with slits not reaching substantially deeper than the depth of said bypath for shaping the magnetic and electric configuration of said bypath so as to reduce the magnetic time constant of said damping eddy currents to a value smaller than half the period of the alternating current of the network to which said synchronous machine is to be connected.

5. A synchronous generator as set forth in calim 4 wherein said rotor within said bypath of said leakage field in the direct axis is provided with circumferential slits not reaching substantially deeper than the depth of said bypath.

6. A synchronous generator as set forth in claim 4 wherein said rotor within both said bypaths is provided with circumferential slits not reaching substantially deeper than the depths of said bypaths.

7. In a synchronous generator, a rotor, field poles upon said rotor, field windings upon said field poles, said rotor having damper circuits about the direct axis and damper circuits about the quadrature axis thereof; said damper circuits including, to the exclusion of any direct axis damper system near the peripheral faces of said poles, damper windings disposed about the direct axis of said rotor and in spaced relation to said peripheral pole faces substantially within the rotor space surrounded by the peripheral zone comprising the bypaths closing the magnetic leakage fields on said rotor respectively between and transversely of said field poles; said damper circuits further including damper windings individually closed about and coaxial with said quadrature axis and disposed within said field poles in proximity to the peripheral faces of said field poles.

8. In a synchronous generator, a rotor having a field system including poles and field windings surrounding said poles for producing a magnetic field in the direct axis of said field system; said rotor further having damper circuits thereon and closed within said rotor, said damper circuits, to the exclusion of any direct axis damper system near the peripheral faces of said poles, including single bars longitudinally disposed in the center planes of said field poles and connectors disposed at the axial faces of said rotor, said bars and said connectors forming a one-bar-per-pole cage upon said rotor.

9. A synchronous generator as set forth in claim 1 wherein said damper circuits about the direct axis include short circuited turns of said field windings, inserted between layers of said field windings.

10. In a synchronous turbo-generator, a cylindrical rotor, field poles on said rotor, said field poles having teeth and slots located therebetween, field windings disposed within said slots, said rotor having damper circuits about the direct axis and damper circuits about the quadrature axis thereof; said damper circuits about the direct axis, to the exclusion of any direct axis damper system near the peripheral faces of said field poles, disposed in spaced relation to the cylindrical surface of said rotor and substantially within the rotor space surrounded by the peripheral zone comprising the by-paths closing the magnetic leakage fields on said rotor respectively between and transversely of said field poles.

11. In a synchronous turbo-alternator, a cylindrical rotor, field poles on said rotor, said field poles having teeth and slots located therebetween, field windings disposed within said slots and wedges for closing said slots, damper circuits upon and closed within said rotor; said damper circuits, to the exclusion of any direct axis damper system near the peripheral faces of said poles, including a damper winding comprising bars of highly conductive material disposed exclusively at the bottoms of said slots and conductive elements for electrically connecting said bars to one another.

12. In a synchronous turbo-alternator, a cylindrical rotor, field poles on said rotor, said field poles having teeth and slots located therebetween, field windings disposed within said slots and wedges for closing said slots, damper circuits upon and closed within said rotor; said damper circuits, to the exclusion of any direct axis damper system near the peripheral faces of said poles, including a damper winding comprising bars of highly conductive material disposed exclusively at the bottoms of said slots and peripheral conductors at least at the axial terminals of said bars and conductively secured thereto.

13. In a synchronous turbo-alternator, a cylindrical rotor, field poles on said rotor, said field poles having teeth and slots located therebetween, field windings disposed within said slots and wedges for closing said slots, damper circuits upon and closed within said rotor; said damper circuits, to the exclusion of any direct axis damper system near the peripheral faces of said poles, including a damper winding comprising bars of highly conductive material disposed exclusively at the bottoms of said slots and, at least at the axial terminals of said bars, conductively secured to the body of said rotor.

14. In a synchronous turbo-alternator, a cylindrical rotor, at least the core of said rotor being of solid magnetic steel admitting of the formation of eddy currents, field poles on said rotor, said field poles having teeth and slots located therebetween, field windings disposed within said slots and metallic wedges for closing said slots, damper circuits upon and closed within said rotor; said damper circuits, to the exclusion of any direct axis damper system near the peripheral faces of said poles, including a damper winding comprising bars of highly conductive material disposed exclusively at the bottoms of said slots and conductive elements at least at the axial terminals of said bars for conductively connecting to one another said bars; said rotor within at least the bypath which closes the magnetic leakage field in the direct axis between said field poles provided with circumferential slits, said circumferential slits extended to and not substantially surpassing the roots of said teeth, thus subdividing said teeth and said wedges.

15. In a synchronous generator, a rotor having a field system including salient poles and field windings surrounding said salient poles for producing a magnetic field in the direct axis of said field system, said rotor further having damper circuits about the direct axis and damper circuits about the quadrature axis of said field system; said damper circuits about the direct axis, to the exclusion of any direct axis damper system near the peripheral faces of said poles, including frames of conductive material and of L-shaped cross section disposed about said salient field poles.

16. A synchronous turbo-generator as set forth in claim 10 wherein said generator is laid out as to self-inductance of the damper circuits, electric resistance of the damper circuits, and magnetic resistance of at least the bypath which closes, on said rotor, the magnetic leakage field in the direct axis, so as to result at normal operation of said generator in a time constant of the fluctuations of at least said last named leakage field smaller than half the period of the alternating current of the network to which said turbo-generator is to be connected.

REINHOLD RUDENBERG.